12) United States Patent
Barillaud et al.

(10) Patent No.: US 8,402,124 B1
(45) Date of Patent: Mar. 19, 2013

(54) METHOD AND SYSTEM FOR AUTOMATIC LOAD BALANCING OF ADVERTISED SERVICES BY SERVICE INFORMATION PROPAGATION BASED ON USER ON-DEMAND REQUESTS

(75) Inventors: Franck Barillaud, Austin, TX (US); Xiaoping Chen, Austin, TX (US); Christopher Michael Morrissey, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 3334 days.

(21) Appl. No.: 09/714,724

(22) Filed: Nov. 16, 2000

(51) Int. Cl.
*G06F 15/173* (2006.01)

(52) U.S. Cl. ...................................... 709/223

(58) Field of Classification Search .................. None
See application file for complete search history.

(56) References Cited

U.S. PATENT DOCUMENTS

| | | | |
|---|---|---|---|
| 5,426,637 A * | 6/1995 | Derby et al. | 370/401 |
| 5,459,837 A | 10/1995 | Caccavale | 395/184.01 |
| 5,603,029 A * | 2/1997 | Aman et al. | 718/105 |
| 5,630,133 A * | 5/1997 | Hotea et al. | 718/101 |
| 5,815,665 A * | 9/1998 | Teper et al. | 709/229 |
| 5,828,847 A | 10/1998 | Gehr et al. | 395/200.69 |
| 5,872,930 A * | 2/1999 | Masters et al. | 709/223 |
| 5,920,868 A * | 7/1999 | Fowlow et al. | 707/103 R |
| 6,014,686 A * | 1/2000 | Elnozahy et al. | 709/224 |
| 6,098,108 A * | 8/2000 | Sridhar et al. | 709/239 |
| 6,324,580 B1 * | 11/2001 | Jindal et al. | 709/228 |
| 6,347,312 B1 * | 2/2002 | Byrne et al. | 707/3 |
| 6,408,306 B1 * | 6/2002 | Byrne et al. | 707/104.1 |
| 6,457,047 B1 * | 9/2002 | Chandra et al. | 709/217 |
| 6,507,562 B1 * | 1/2003 | Kadansky et al. | 370/216 |

OTHER PUBLICATIONS

Hac et al., "A Study of Dynamic Load Balancing in a Distributed System", Proc. of the ACM SIGCOMM Conf. on Comm. Architecture and Protocols, pp. 348-356, Aug. 1986.
"Workload Balancing in a Distributed Environment", IBM Technical Disclosure Bulletin, v. 38, n. 11, pp. 273-276, Nov. 1995.

* cited by examiner

*Primary Examiner* — Jeffrey R Swearingen
(74) *Attorney, Agent, or Firm* — Yee & Associates, P.C.; Jeffrey S. LaBaw

(57) ABSTRACT

A methodology for balancing demand for networked services in a distributed data processing system is presented. Each client is uniquely associated with a local service manager; one or more local service managers are located throughout a distributed data processing system, and each local service manager provides access to networked services for associated clients. Each local service manager is uniquely associated with a distributed service manager; one or more distributed service managers are located throughout the distributed data processing system, and each distributed service manager provides access to networked services for associated local service managers. A client sends a service request to its local service manager, which returns information about a matching service to the client after finding a matching service that has characteristics that match parameters in the request. If the local service manager does not have information about a matching service, then the request is forwarded to its associated distributed service manager. If the distributed service manager does not have information about a matching service, then the request is broadcast to all distributed service managers. If the distributed service manager has two or more matching services, then it performs a load balancing operation to select a best service to be returned.

15 Claims, 16 Drawing Sheets

METHOD AND SYSTEM FOR AUTOMATIC LOAD BALANCING OF ADVERTISED SERVICES BY SERVICE INFORMATION PROPAGATION BASED ON USER ON-DEMAND REQUESTS

BACKGROUND OF THE INVENTION

1. Field of the Invention

The present invention relates to an improved data processing system and, in particular, to a method and apparatus for enhancing network services. Still more particularly, the present invention provides a method and system for configuration and allocation of networked resources.

2. Description of Related Art

In a highly distributed computational system, the applications that perform operations for a given network service may be dispersed on physical devices throughout the network. Applications on other physical devices that desire access to the given network service must be provided with information on the manner in which a connection with the network service can be obtained.

A complete inventory of available networked resources may be distributed throughout the system. In a system in which networked resources are continually going online and offline, a significant amount of attention must be given to dispersing information about the availability of networked resources and their location, both physical location and logical location or organization.

In any given network, the demand for networked resources fluctuates over time. In a highly distributed computing system, all of the computer platforms may have varying needs for networked resources, thereby creating a very dynamic environment for managing networked resources.

Generally, network management software within the distributed computing system satisfies the demand for networked resources using some type of load balancing such that all service requesters eventually get access to the requested service. It is sometimes critical to load balance the demand for services by distributing the request workload across the entire system in order to ensure fair access.

When multiple concurrent access is needed to satisfy the request workload, most existing systems only rely on some internal metrics without any knowledge of the outside environment. For example, a system may monitor its number of concurrent client connections to ensure that the number does not exceed a maximum threshold. Many current load balancing implementations are based on complex algorithms that apply only to a specific configuration.

In order for a load balancing mechanism to operate successfully using internal metrics, a mathematical model of the expected behavior of the system must closely approximate the actual demands that are placed on the system. In a system in which the behavior of its devices and applications can be relatively easily monitored, an accurate model might be easily devised. However, in a highly distributed environment, the load demand can vary greatly, and it is difficult to devise a load balancing mechanism based on internally derived metrics.

Therefore, it would be advantageous to provide a method and system for automatically load balancing the demand on networked resources based on user-driven demand.

SUMMARY OF THE INVENTION

A method, a system, an apparatus, and a computer program product for balancing demand for networked services in a distributed data processing system is presented. Each client is uniquely associated with a local service manager; one or more local service managers are located throughout the distributed data processing system, and each local service manager provides access to networked services for associated clients. Each local service manager is uniquely associated with a distributed service manager; one or more distributed service managers are located throughout the distributed data processing system, and each distributed service manager provides access to networked services for associated local service managers. A client sends a request for a networked service to its local service manager. The local service manager returns information about a matching service to the client after finding a matching service that has characteristics that match parameters in the request. If the local service manager does not have information about a matching service, then the request is forwarded to its associated distributed service manager. If the distributed service manager does not have information about a matching service, then the request is broadcast to all distributed service managers. If the distributed service manager has two or more matching services, then it performs a load balancing operation to select a best service to be returned.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

Figure 1:
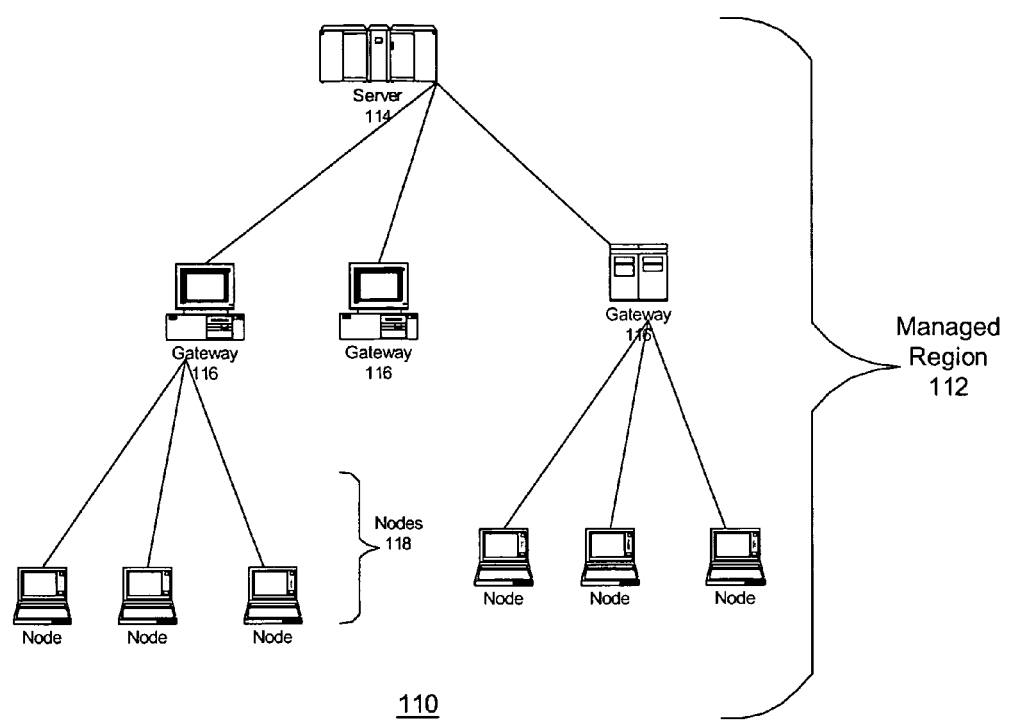
FIG. 1 illustrates a simplified diagram showing a large distributed computing enterprise environment in which the present invention may be implemented.

With reference now to FIG. 1, the invention is preferably implemented in a large distributed computer environment 110 comprising many thousands of nodes. The nodes will typically be geographically dispersed, and the overall environment is "managed" in a distributed manner. Preferably, the managed environment is logically organized into a series of loosely-connected managed regions 112, each of which has its own server 114 for managing local resources within the managed region. Multiple servers 114 coordinate activities across the enterprise and permit remote site management and operation. Each server 114 serves a number of gateway machines 116, each of which in turn support a plurality of endpoints or terminal nodes 118. Server 114 may coordinate all activity within the managed region using a terminal node manager (not shown).

Various types of networks may be used to provide communications links between various devices and computers connected together within the distributed data processing system, such as an intranet, a local area network (LAN), or a wide area network (WAN). The network may include permanent connections, such as wire or fiber optic cables, or temporary connections made through telephone or wireless communications. The distributed data processing system may include additional servers, clients, routers and other devices not shown. In the depicted example, the distributed data processing system may include the Internet within the network representing a worldwide collection of networks and gateways.

The distributed computer environment is managed as a form of client-server architecture with a system management framework. The system management framework includes both client components and server components. The client component is preferably a low cost, low maintenance application suite that is preferably "dataless" in the sense that system management data is not cached or stored by the client component in a persistent manner. Preferably, the system management framework uses an object-oriented approach that facilitates execution of system management services required to manage the resources in the managed region. Such services can be varied and may include, without limitation, file and data distribution, network usage monitoring, user management, and printer or other resource configuration management. Each service is represented in an appropriate manner by one or more objects throughout the distributed environment.

In a large enterprise such as that illustrated in FIG. 1, there may be one server per managed region with some number of gateways. For a smaller, workgroup-size installation configured on a single LAN, for example, a single server-class machine may be used as both the server and the gateway, and the client machines may run the low cost framework. For larger installations, the managed region may grow breadth-wise with additional gateways being used to balance the load of the endpoints or terminal nodes.

While a server, a gateway, and an endpoint may be software components that may be treated as logically separate entities residing on the same machine, each server, each gateway, and each endpoint are preferably separate machines or computers. For example, each computer may be a RISC-based workstation running the AIX (Advanced Interactive Executive) operation system. It may be assumed that a server is able to support hundreds of simultaneous network connections to remote machines. Each endpoint may also be a separate computer, such as an Intel Pentium-based computer running the Microsoft Windows operating system. Servers, gateways, and endpoints may also be represented by a variety of computing devices, such as mainframes, personal computers, personal digital assistants (PDAs), etc.

FIG. 1 is intended as an example of a heterogeneous computing environment and not as an architectural limitation for the present invention. The present invention could be implemented on a variety of networks. Those of ordinary skill in the art will also appreciate that the hardware in FIG. 1 may vary depending on the system implementation. The depicted examples are not meant to imply architectural limitations with respect to the present invention. In addition to being able to be implemented on a variety of hardware platforms, the present invention may be implemented in a variety of software environments.

It is important to note that while the present invention is described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

Figure 2:
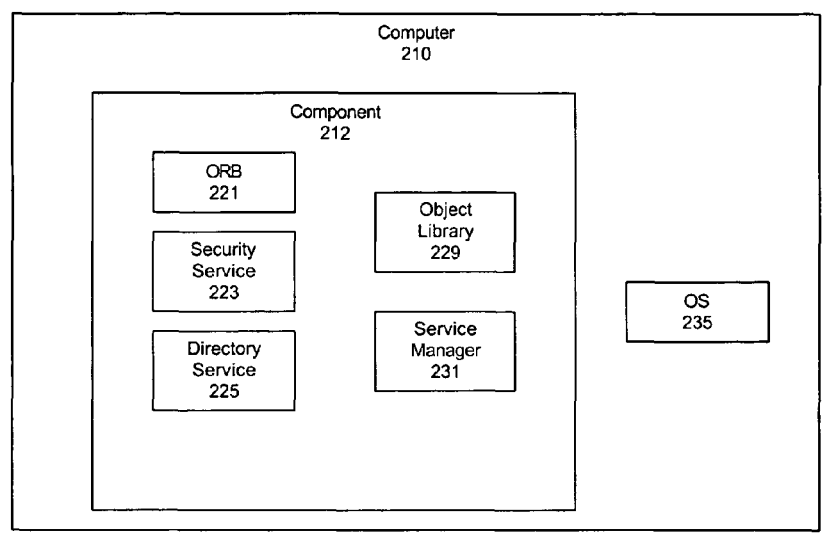
FIG. 2 is a block diagram depicting a system management framework illustrating a software environment in which the present invention may be implemented.

With reference now to FIG. 2, a block diagram depicts a system management component illustrating a software environment in which the present invention may be implemented. Each machine 210 within the system runs component 212 of the system management framework. Component 212 may be a multi-threaded runtime process that comprises several subcomponents: object request broker (ORB) 221; security service 223; and directory service 225. Component 212 also includes object library 229 and service manager 231. Preferably, ORB 221 runs continuously, separate from the operating system. The ORB may be an instance of a CORBA ORB; CORBA is a specification for an object-oriented distributed computer systems management architecture provided by the Object Management Group (OMG), a non-profit association of companies. Computer 210 also includes operating system 235 and may contain some form of interprocess communication facility for supporting communication between server and client objects and processes.

The present invention may be implemented on a variety of hardware and software platforms, as described above. More specifically, though, the present invention is directed to automatically load balancing the demand for networked resources based on user-driven demand. A System Service Manager (SSM) provides access to services for client-server entities or peer-to-peer entities on a network. Its main function is to manage the services to enable clients to access services in a uniform manner. The SSM preferably provides: decentralized operation such that the SSM requires little administrative intervention in small installations and limited administrative intervention in large enterprise deployments; scalability from few to many servers; optional administrative grouping of services so that administrators can configure the SSM so that clients can only discover an intended set of services through a site policy; and robust access to services that allows access by certain characteristics, e.g., allowing a client to find an appropriate backup service if another service fails.

The SSM supports services that must be started locally in order to have the ORB provide full functionality, and the SSM also supports optional services that publish information outside of the scope of the ORB that may be used by clients, such as user applications, other services, etc.

Services may be placed into three categories: local ORB services, which are services that provide internal services and are only valid in the local ORB scope; non-advertised services, which are instantiated on each ORB and, therefore, do not need to be advertised; and advertised services, which may be accessed from outside of the scope of the local ORB.

Figure 3:
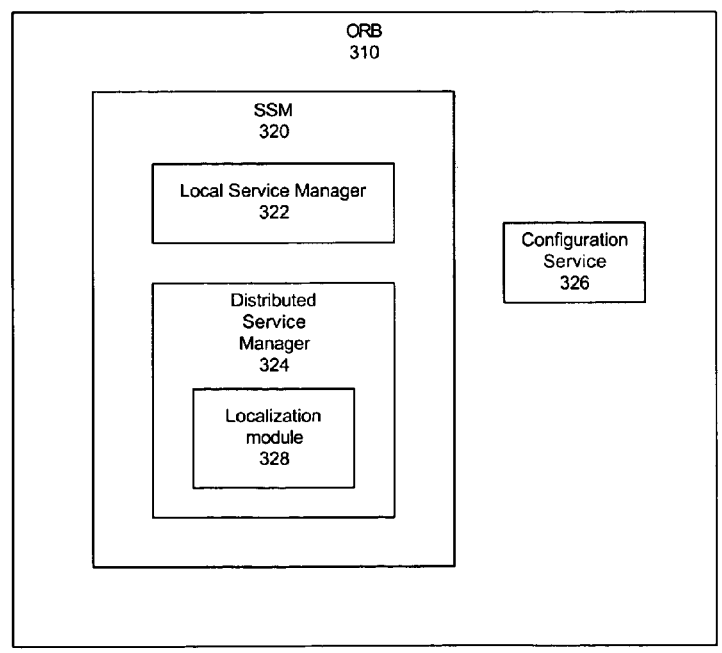
FIG. 3 is a block diagram depicting a configuration of software components that may used to implement the System Service Manager in a preferred embodiment of the present invention.

With reference now to FIG. 3, a block diagram depicts a configuration of software components that may used to implement the System Service Manager in a preferred embodiment of the present invention. The System Service Manager (SSM) framework is logically built around two different types of components, the Local Service Manager (LSM) and the Distributed Service Manager (DSM). The SSM uses the Configuration Service to enable customization of various LSMs and DSMs. The Configuration Service can also be used to retrieve a specific service configuration.

An LSM is a piece of code running on each node of a distributed computing environment. An LSM has the same lifecycle as the ORB, and an LSM's main responsibility is to keep track of the services defined locally and to provide access to all of the services within the System Service Manager infrastructure. DSMs are located throughout the distributed computing environment and act as gateways for LSMs in order to access service configuration information and LSM location information. The DSMs also provide load balancing by minimizing the paths and the requests to access the services, as is described in more detail further below. The Configuration Service is a service that provides static information about the services, which are registered into the Configuration Service at installation time.

ORB 310 supports System Service Manager functionality 320, which is a group of SSM components. The SSM components are shown within ORB 310 to indicate their reliance on the ORB to support their own functionality; however, the SSM components should not be considered as integral to the ORB but rather as co-located with the ORB, more like components within service manager 231 shown in FIG. 2. In this example, ORB 310 concurrently supports LSM instance 322, DSM instance 324, and Configuration Service component instance 326. It should be noted, however, that a given ORB supports at least one LSM and may support a DSM.

The DSMs are designed to perform several tasks. The DSMs act as relays in the process of forwarding a request to get access to an SSM service. DSMs cache the proxies to the services in order to maintain a constant level of performance across a network, and DSMs can also locate other DSMs within the same region.

DSMs also achieve a portion of the load balancing functionality by being distributed throughout the distributed computing environment in strategic locations. Each DSM contains localization module 328 that enables the load balancing functionality of a DSM to be customized. Since the DSMs are distributed through the network, each DSM may execute on a unique hardware platform with a unique set of supported services and with a unique demand load for requested services. Each DSM can be customized by establishing parameters within its localization module so that the DSM performs its load balancing duties in a manner that is tailored for the functionality desired from each DSM.

After initialization, every LSM is connected to at least one DSM. The LSMs only manage the lifecycle of services that are defined locally. The LSM gets the service configuration information from the Configuration Service. The Configuration Service entries describe properties related to the services as appropriate to the type of service. After being started by the ORB, the LSM keeps track of all the services defined by the Configuration Service and waits for client requests to access the SSM services. For example, at some point in time, an application on a node may request a service with particular properties, such as a local print service at a specific building location "BLDG1" and a specific floor location "FLR3". The LSM can determine whether a print service is available by searching for a service entry with those properties. If a matching service is not found, then the LSM can notify the requester that the requested service is not available.

Various types of services may be active within the distributed computing environment at any given time. For example, services are installed and configured through the Configuration Service. Each service is delivered as one or more software components with an accompanying service template file that describes the service. Another service is the Planning and Distribution Service, which can use the service template file as input into the Configuration Service, thereby receiving the information that will later be used by the LSM to manage the service. While many types of services are present in the distributed environment, the present invention is directed to the functionality of distributed load balancing, and other services that are not critical to the operation of the present invention are not presented in detail.

As noted above, services may be categorized as local ORB services, non-advertised services, and advertised services. An LSM provides access to the SSM services based on the following considerations: an LSM does not provide access to local ORB services; an LSM provides access to non-advertised services only through requests based on an ORB identifier; and an LSM provides access to advertised services through requests based on both a service specification string and an ORB identifier.

With reference now to FIGS. 4A-4D, a series of flowcharts depict a manner in which a client program can access a service within the System Service Management framework. A client receives references to services through a call to either a getService( ) method or a getServices( ) method. If the client uses the getService( ) method, then a best selection for a service that matches the client's request is returned to the client when available. If the client uses the getServices( ) method, then all services that match the client's request are returned to the client. The flowcharts shown in FIGS. 4A-4D describe the use of the getService( ) method. The use of the getServices( ) method is described further below.

Figure 4A:
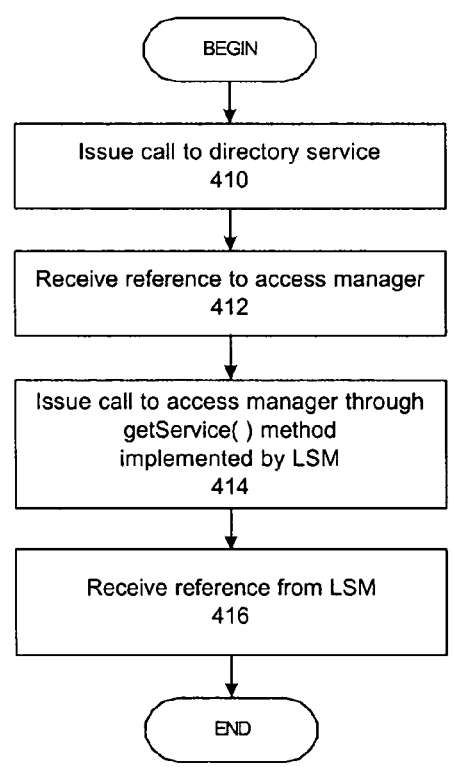
FIGS. 4A-4D are a series of flowcharts depicting a manner in which a client program can access a service within the System Service Management framework.

Referring to FIG. 4A, the process starts when a client issues a call to the directory service to locate an access manager (step 410), and the client then receives a reference to the access manager (step 412). The access manager provides a single entry point or interface for accessing both services and component objects.

The client then issues a call to the access manager through the getService( ) method implemented by the LSM (step 414). The process then completes when the client receives a reference for a matching service from the LSM (step 416). However, if no matching service were available, then the client would receive some type of status from the LSM indicating that a service that matches the request is not available.

Figure 4B:
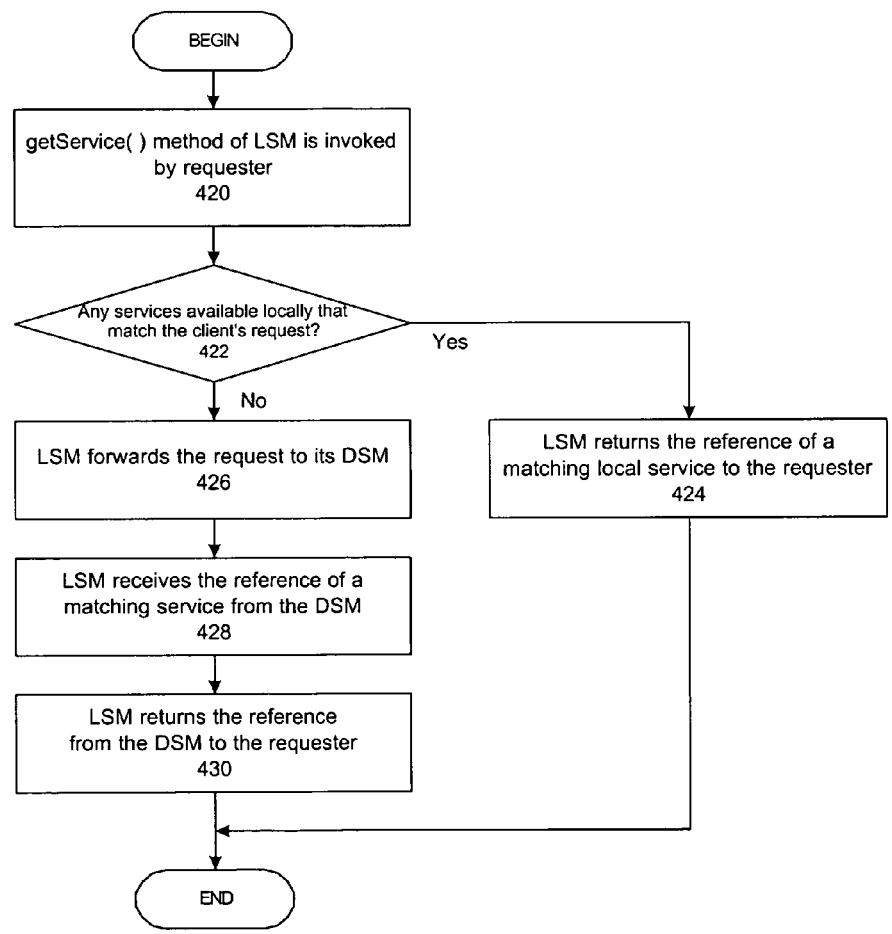

Referring to FIG. 4B, a flowchart shows the manner in which an LSM processes a request from a client. The process begins when the getService( ) method of the LSM is invoked by a client (step 420). The LSM makes a determination whether or not a service known to the LSM has parameters that match the service characteristics in the request (step 422). If so, then the LSM returns a reference to the matching service to the requesting client (step 424), and the process is complete.

If the LSM does not have any knowledge of a service that would match the request, as determined in step 422, then the LSM forwards the request to its DSM (step 426). At some later time, the LSM receives a reference to a service from the DSM that fulfills the request (step 428). The LSM then returns the reference from the DSM to the requesting client (step 430), and the portion of the process on the LSM is complete. However, if the LSM does not receive a references from its DSM, the LSM may inform the requesting client with an appropriate status message. Alternatively, the requesting client may timeout requests to the LSM.

Figure 4C:
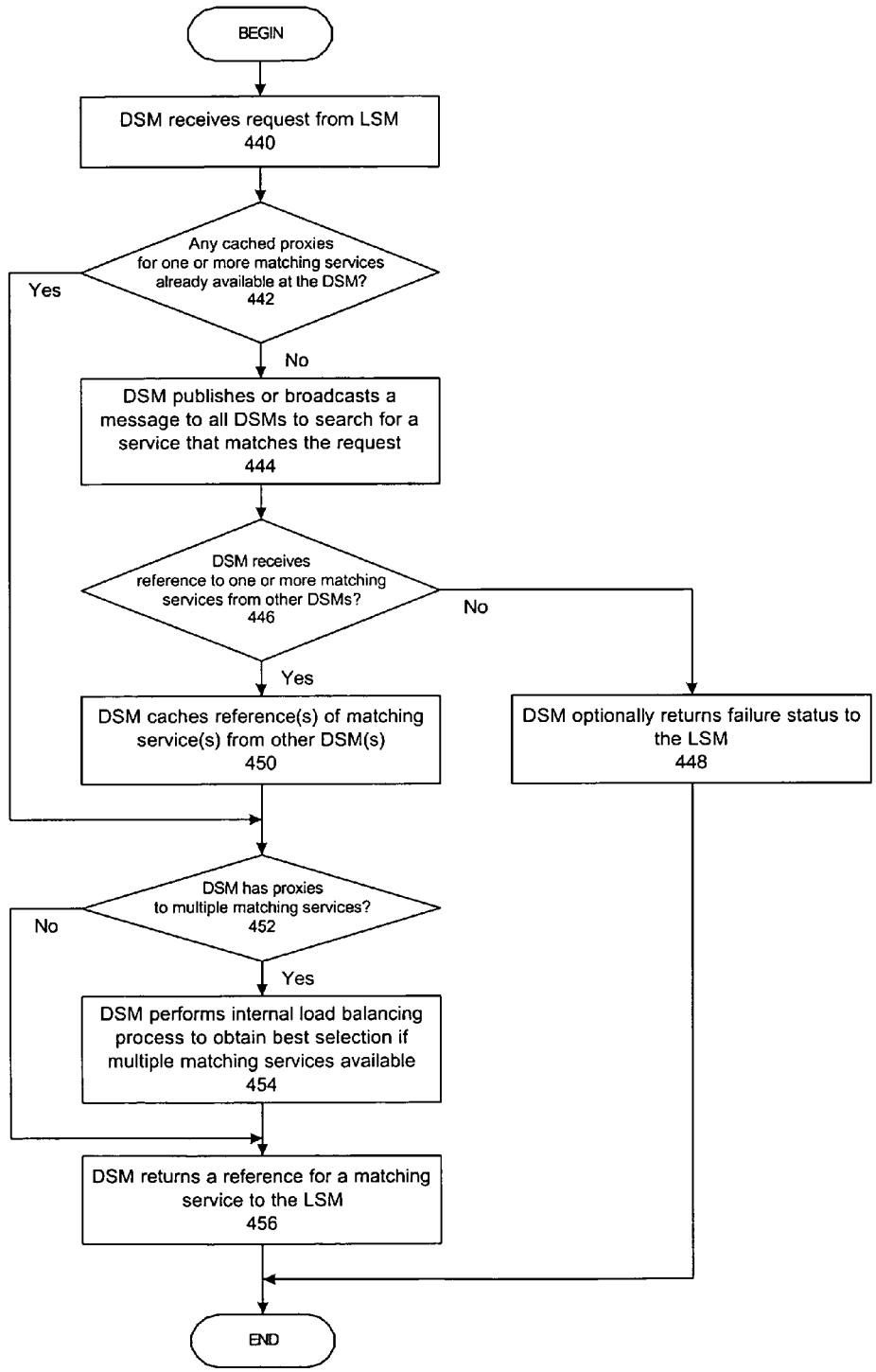

Referring now to FIG. 4C, a flowchart shows the manner in which a DSM processes a request from one of its LSMs. The process begins when the DSM receives a request from an LSM (step 440). The DSM checks whether or not it has any cached proxies for one or more services that have characteristics that match the parameters specified in the request (step 442). If so, then the process branches for appropriate processing.

If the DSM does not have any knowledge of any matching services, then the DSM publishes or broadcasts a message to all DSMs to search for a service that matches the request (step 444). At some later time, the DSM determines whether or not the DSM has received one or more references from other DSMs for services that match the request (step 446). If not, then the DSM may optionally return a status message to the LSM to inform the LSM that no matching services have been found (step 448), and the portion of the process within the DSM is then complete.

If the DSM has received at least one reference for a matching service from another DSM, then the DSM caches the reference or references (step 450). The DSM then makes a determination whether or not the DSM has knowledge of multiple services that fulfill the original request (step 452).

If the DSM has knowledge of multiple services that can fulfill the request, then the DSM performs an internal load balancing process to obtain the best selection of a single service (step 454). At this point, the DSM may invoke its localization module, which provides parameters to be used during the load balancing process. When more than one matching service is known at the DSM level, the localization module can compare characteristics of the matching services with specified parameters in the localization module.

For example, the localization module may inform a load balancing routine to examine the hop count (HC), the bottleneck link speed (BLS), or return trip time (RTT) for a matching service. A hop count is determined from the number of discreet transmissions, or hops, between the requester or DSM and the device on which the matching service resides, i.e. the number of times which a packet must be routed along a network path. The bottleneck link speed is determined from the slowest transmission speed of any link within the network path between the requester or DSM and the device on which the matching service resides. The return trip time is the amount of time to receive a response from a service at a requester or DSM, which may depend on both the HC or BLS.

The localization module may examine the HC, BLS, or RTT, or some combination of these or other network-related parameters or metrics, in order to determine which matching service seems to be the best selection for the given requesting client. It should be noted that the HC, the BLS, or the RTT may be determined at network configuration time or in real-time by gathering this information at the DSM when performing a load balancing operation.

After selecting either the best matching service, as determined in step 454, or the only matching service, as determined in step 452, the DSM returns a reference for a matching service to the LSM (step 456), and the portion of the requesting process within the DSM is complete.

Figure 4D:
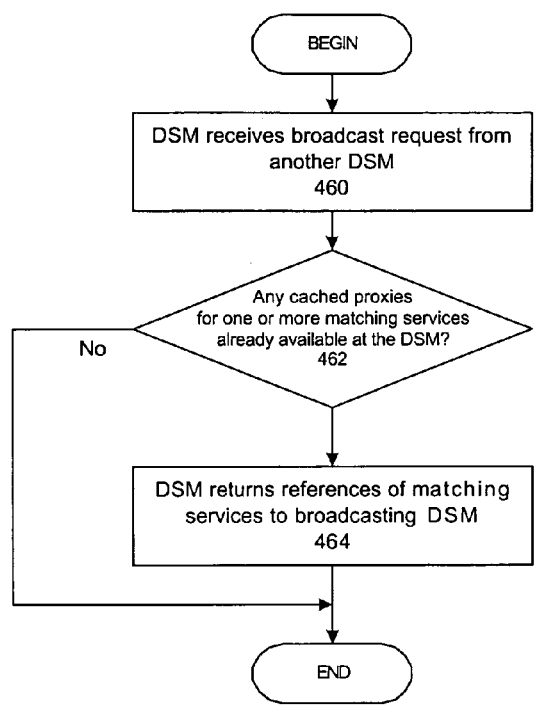

Referring now to FIG. 4D, a flowchart shows the manner in which a DSM processes a broadcast request from another DSM. The process begins when the DSM receives a broadcast request from another DSM (step 460). The DSM determines whether it has any cached proxies for one or more matching services already available at the DSM (step 462). If not, then the broadcast request may be ignored, and the process is then complete.

If the DSM has one or more matching services, then the DSM returns references for all matching services to the broadcasting DSM (step 464), and the process is complete.

Figure 5:
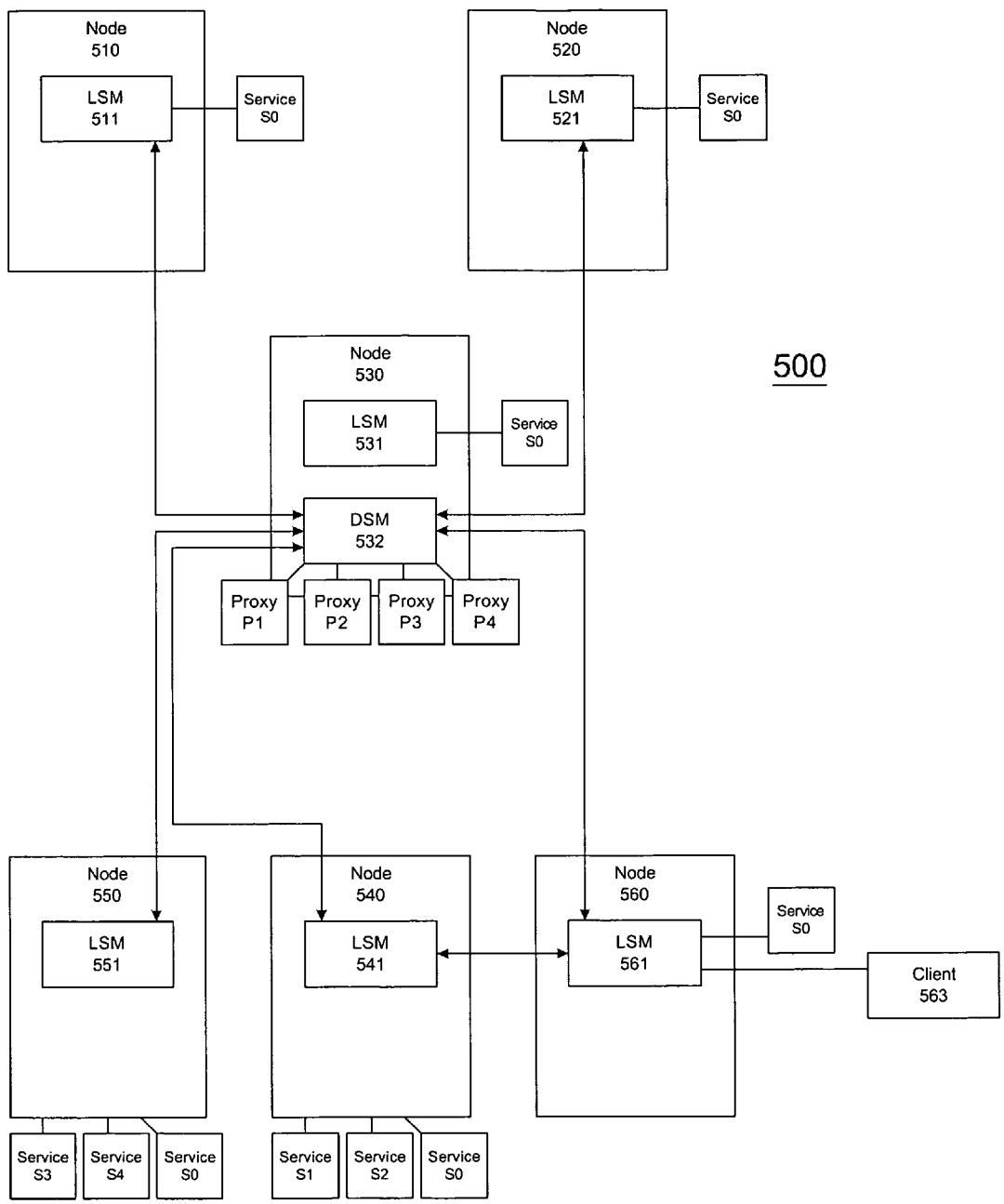
FIG. 5 is a block diagram depicting a snapshot of a set of services within a distributed computer environment that is implementing a System Service Manager framework.

With reference now to FIG. 5, a block diagram depicts a snapshot of a set of services within a distributed computer environment that is implementing a System Service Manager framework in accordance with a preferred embodiment of the present invention. System 500 merely illustrates an exemplary system and some of the processing within the system; the manner in which services are accessed is shown in more detail further below with respect to FIGS. 6-12.

System 500 contains nodes 510, 520, 530, 540, 550, and 560, which contain LSMs 511, 521, 531, 541, 551, and 561 respectively. Service S0 does not need to be advertised because it is running on all of the nodes; therefore, the only way to access service S0 is through an ORB ID that specifies the target node. Services S1-S4 are advertised, and DSM 532 is maintaining proxies P1-P4 for services S1-S4, respectively. When client 563 tries to access service S0 on node 540 by specifying the proper ORB identifier, the request is forwarded directly to target node 540 by LSM 561. For that request, DSM 532 is not involved, and LSM 561 handles the whole request.

When client 563 tries to access the advertised service S2 through a service specification string, the request is forwarded to DSM 532, and DSM 532 returns a cached proxy P2 to LSM 561, which is returned to client 563.

Figure 6:
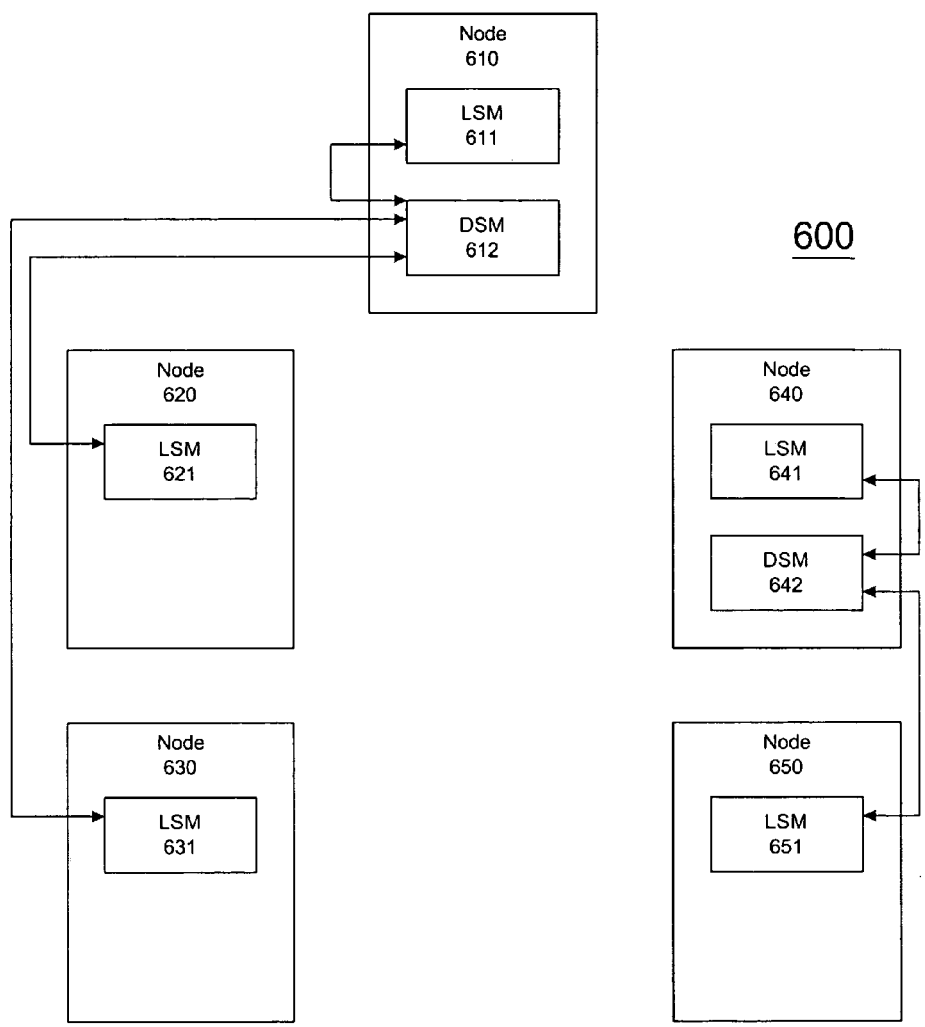
FIG. 6 is a block diagram showing the manner in which a set of LSMs and DSMs build their relationships within a distributed system implementing a System Services Manager framework.

With reference now to FIG. 6, a block diagram shows the manner in which a set of LSMs and DSMs build their relationships within a distributed system implementing a System Services Manager framework in accordance with a preferred embodiment of the present invention. Every time an ORB is initialized, the ORB also starts an instance of an LSM, to which it passes a DSM reference. The DSM may be local or remote according to the environment configuration. When a DSM and a LSM are co-located on the same node, the LSM receives the reference of the local DSM instead of a reference to a remote DSM.

System 600 contains nodes 610, 620, 630, 640, and 650, which contain LSMs 611, 621, 631, 641, and 651, respectively. Node 610 contains DSM 612, and node 640 contains DSM 642. LSMs 611, 621, and 631 receive a reference to DSM 612, whereas LSMs 641 and 651 receive a reference to DSM 642.

Figure 7:
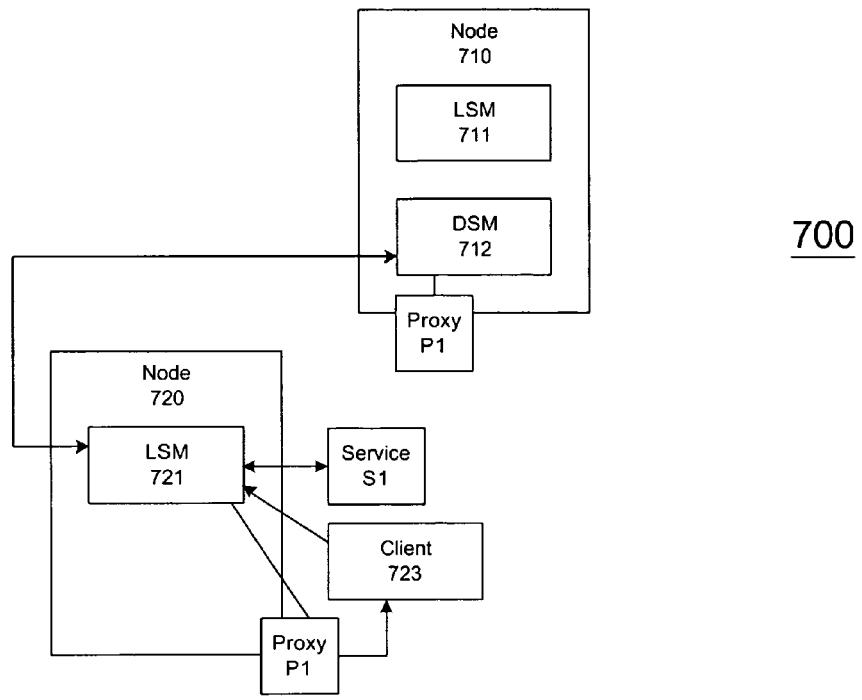
FIG. 7 is a block diagram depicting the manner in which a getService( ) method may be invoked on a Local Service Manager.

With reference now to FIG. 7, a block diagram depicts the manner in which a getService( ) method may be invoked on a Local Service Manager. System 700 contains nodes 710 and 720, which contain LSMs 711 and 721, respectively. LSM 721 manages service S1 and has proxy P1 for service S1. Node 710 also contains DSM 712, which has a cached copy of proxy P1. Client 723 requests access to service S1 located on the same machine using the getService( ) method. Since service S1 is a service that has been previously started locally, a match is found by LSM 721, and proxy P1 is returned to client 723 without any interaction with DSM 712.

Figure 8:
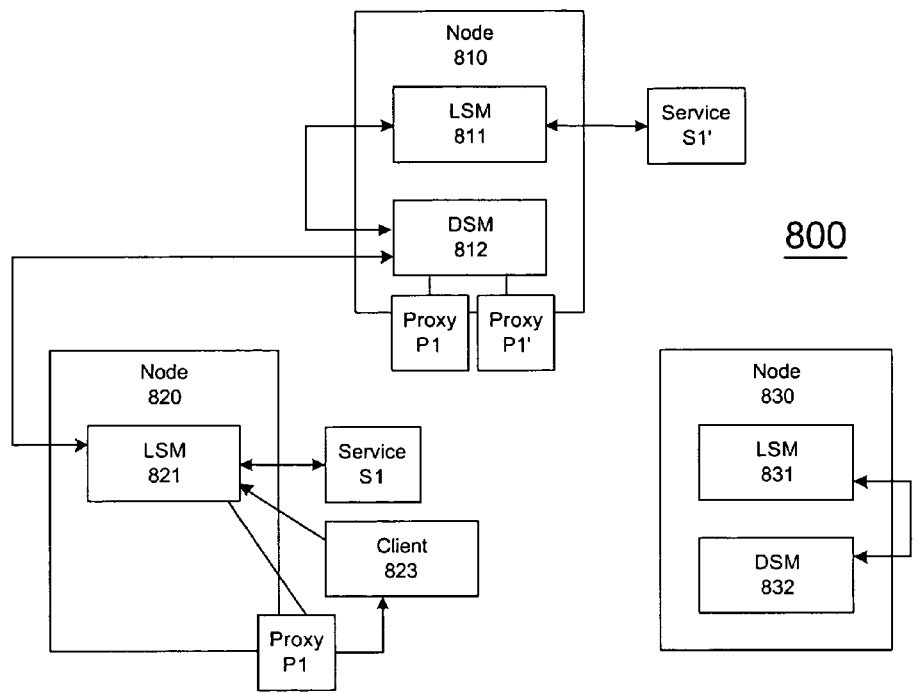
FIG. 8 is a block diagram depicting the manner in which a getServices( ) method may be invoked on a Local Service Manager to obtain advertised services.

With reference now to FIG. 8, a block diagram depicts the manner in which a getServices( ) method may be invoked on a Local Service Manager to obtain advertised services. When a request is performed using the getServices( ) method, all of the DSMs are called to check if they maintain a proxy that matches the input criteria. All of the matching proxies are then returned to the caller. A client may use the getServices( ) method instead of the getService( ) method if the client desires to perform its own selection from among multiple available services.

System 800 contains nodes 810, 820, and 830, which contain LSMs 811, 821, and 831, respectively. LSM 821 manages service S1 and has proxy P1 for service S1. Node 830 contains DSM 832. Node 810 also contains DSM 812, which has a cached copy of proxy P1. LSM 811 also manages an instance of service S1', and DSM 812 has a cached copy of proxy P1'.

Client 823 invokes the getServices( ) method for services with particular criteria, which happens to match service S1 on node 820. Since service S1 is a service that has been previously started locally, a match is found by LSM 821, and LSM 821 returns proxy P1 that matches the criteria locally. The request is then forwarded to DSM 812, which also forwards the request to all of the other DSMs. DSM 812 also maintains a proxy P1' to a service S1' that matches the requested criteria, and proxy P1' is also returned to client 823. Since DSM 832 does not maintain any references to a service S1 or any services that fulfill the request, DSM 832 does not respond.

Figure 9A:
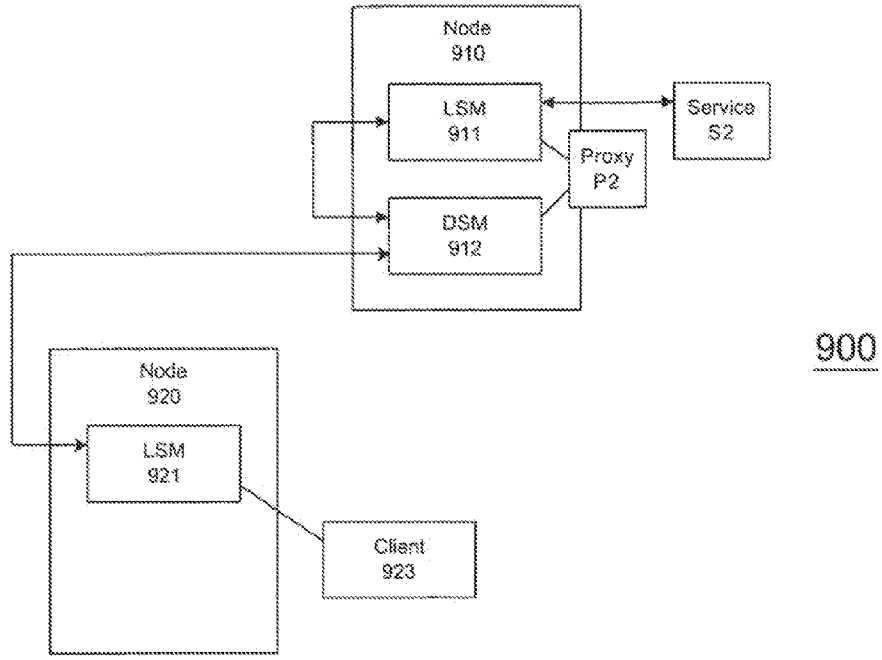
FIG. 9 is a block diagram depicting some of the actions that are performed when a client tries to access a service remotely.
Figure 9B:
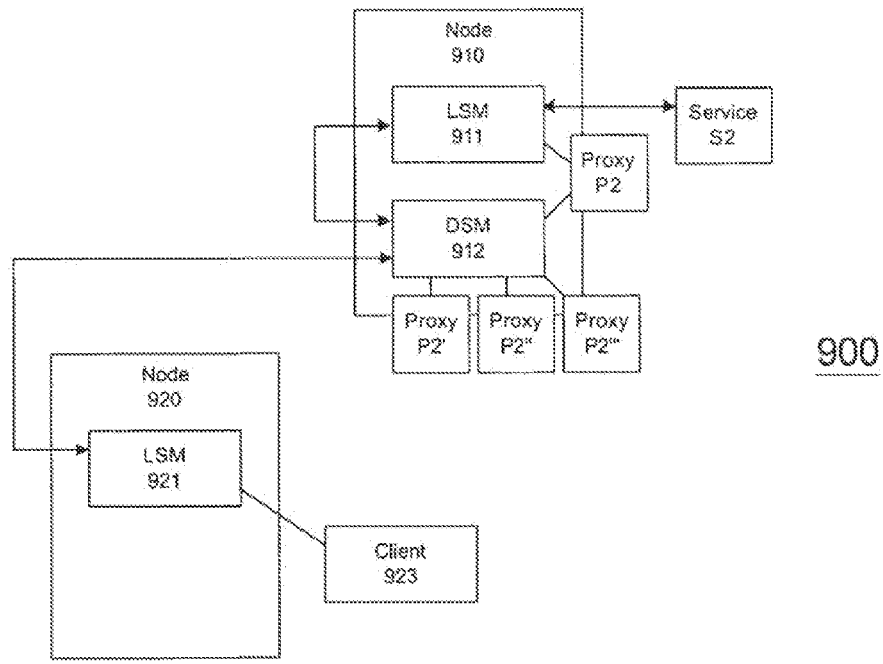

With reference now to FIGS. 9A-9B, block diagrams depict some of the actions that are performed when a client tries to access a service remotely. System 900 contains nodes 910 and 920, which contain LSM 911 and 921, respectively. Node 910 also contains DSM 912, which shares proxy P1 with LSM 911 that is supporting service S2.

Referring to FIG. 9A, client 923 sends a request to access service S2 to LSM 921, which checks an internal table to determine if it maintains a proxy to service S2 that matches the criteria of the request. After LSM 921 determines that it has no matching proxy, LSM 921 checks if DSM 912, to which it is connected, holds a reference to service S2. DSM 912 knows about service S2, so it returns proxy P2 for service S2 to LSM 921. Before returning the proxy, DSM 912 may check to determine whether service S2 is still alive by issuing a request to service S2 and checking if service S2 responds to the request.

Referring now to FIG. 9B, DSM 912 has multiple cached proxies P2', P2'', and P2''' from which DSM 912 may select a best service after performing an internal load balancing process. Each of the proxies P2', P2'', and P2''' have been previously cached when DSM 912 attempted to fulfill prior requests and received references to other services from other DSMs within the network (not shown).

Figure 10A:
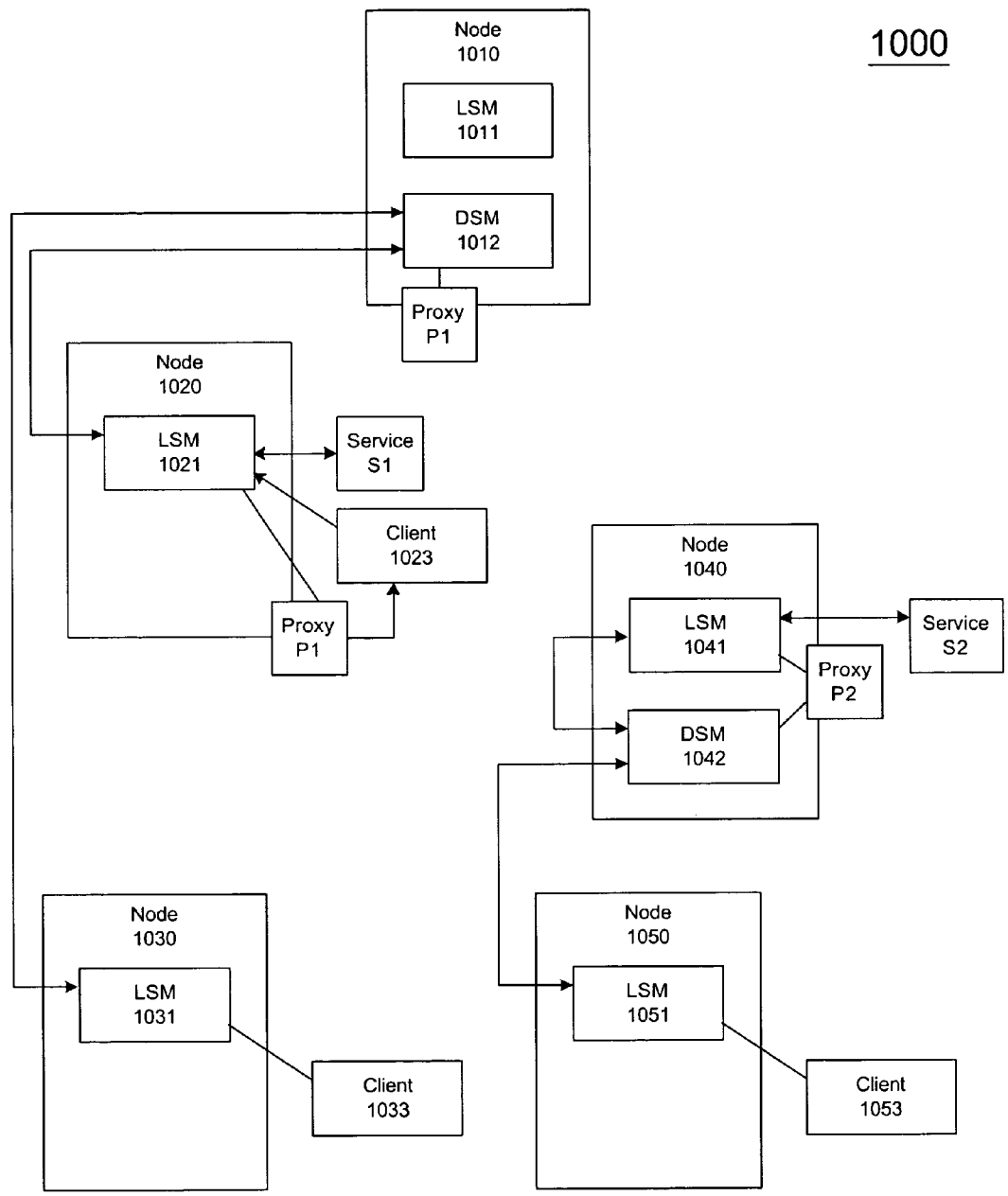
FIGS. 10A-10B are block diagrams depicting some of the actions that are generally performed to create, maintain, and provide access to services within the System Service Manager framework.
Figure 10B:
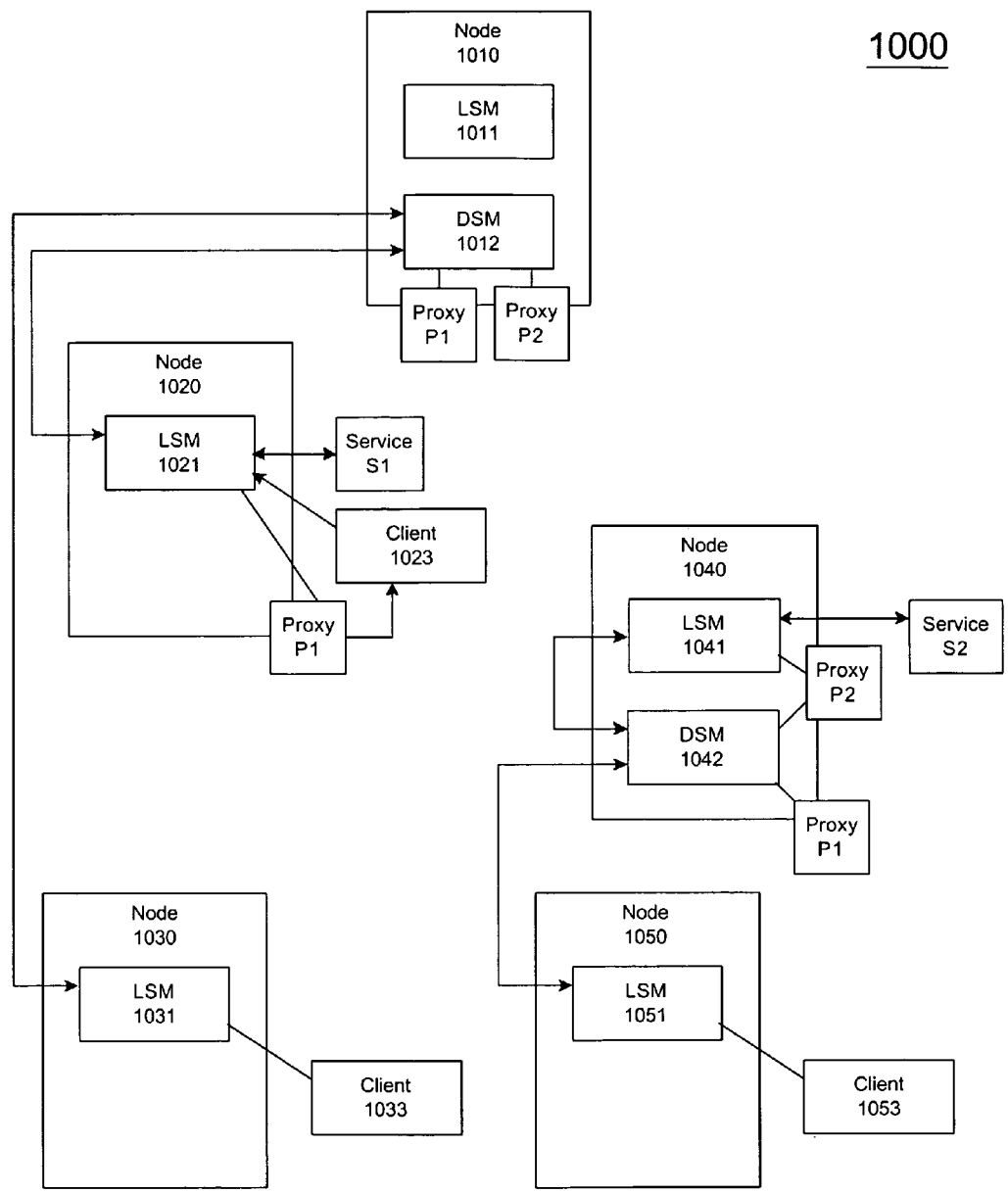

With reference now to FIGS. 10A-10B, block diagrams depict some of the actions that are generally performed to create, maintain, and provide access to services within the System Service Manager framework in accordance with a preferred embodiment of the present invention. In both FIGS. 10A-10B, system 1000 contains nodes 1010, 1020, 1030, 1040, and 1050, which contain LSMs 1011, 1021, 1031, 1041, and 1051, respectively. LSM 1021 manages service S1 and has proxy P1 for service S1. Node 1040 contains DSM 1042, which shares proxy P2 with LSM 1041 that manages service S2. Node 1010 also contains DSM 1012, which has a cached copy of proxy P1. LSMs 1021 and 1031 are connected to DSM 1012. LSM 1041 and LSM 1051 are connected to DSM 1042.

Referring to FIG. 10A, when client 1033 attempts to access service S2, a request is sent to LSM 1031, which does not know about service S2, so the request is forwarded to DSM 1012. Since DSM 1012 does not have any knowledge about service S2, it publishes or broadcasts a message looking for a DSM that has knowledge about service S2. DSM 1042 knows about service S2, so DSM 1042 returns all available information about it. DSM 1012 then caches a copy of proxy P2 locally and returns proxy P2 to LSM 1031, which is returned to client 1033. If client 1053 desires access to service S1, a similar process would be followed, resulting in proxy P1 being stored by DSM 1042.

Referring to FIG. 10B, after running for a while, the system will reach equilibrium with proxies to a given service equally distributed among all the DSMs. FIG. 10B shows proxy P2 cached at DSM 1012 and proxy P1 cached at DSM 1042.

Figure 11A:
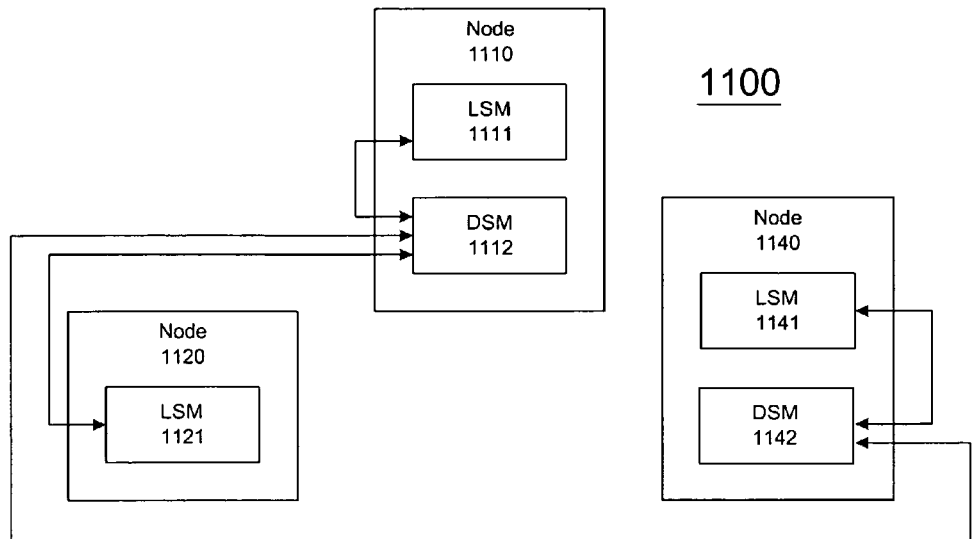
FIGS. 11A and 11B show the processing that is performed if a DSM terminates.
Figure 11B:
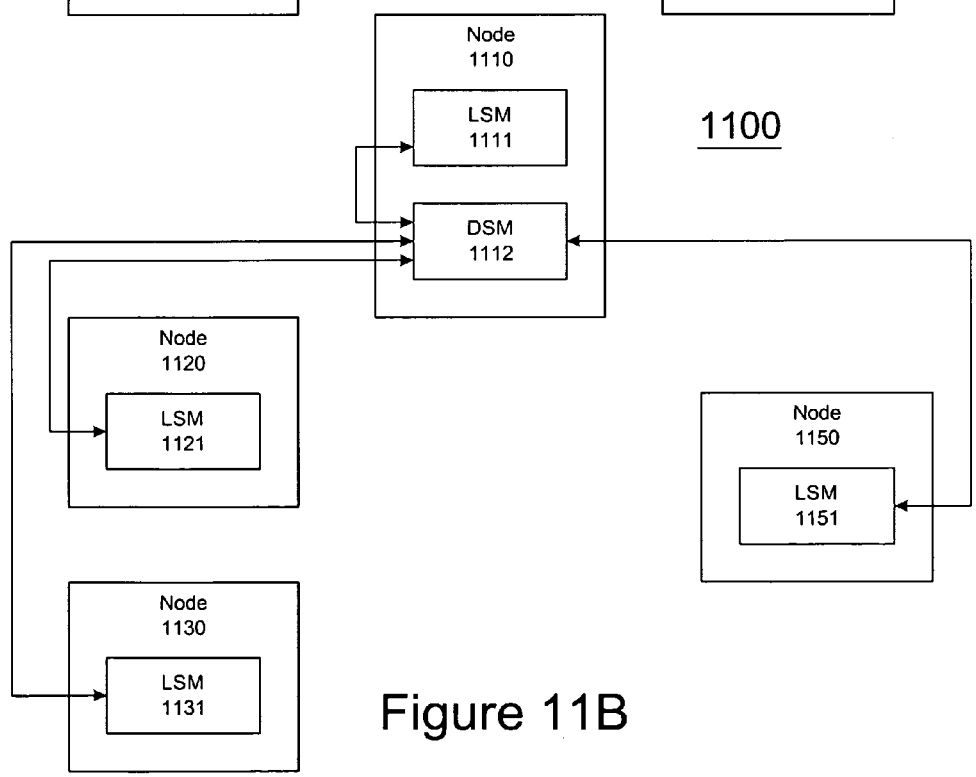

With reference now to FIGS. 11A and 11B, two diagrams show the processing that is performed if a DSM terminates. Each LSM implements a monitoring mechanism that detects if the DSM to which it is connected is up and running. System 1100 contains nodes 1110, 1120, 1130, 1140, and 1150, which contain LSMs 1111, 1121, 1131, 1141, and 1151, respectively. Node 1140 contains DSM 1142, and node 1110 also contains DSM 1112. LSMs 1111, 1121, and 1131 are connected to DSM 1112, and LSM 1141 and LSM 1151 are connected to DSM 1142.

When LSM 1151 detects that DSM 1142 has failed, LSM 1151 publishes or broadcasts a message to get a reference to a new DSM. Once a new reference is received, LSM 1151 can upload all of the information related to the services that LSM 1151 is managing. In FIG. 11B, LSM 1151 has received a reference to DSM 1112.

Figure 12:
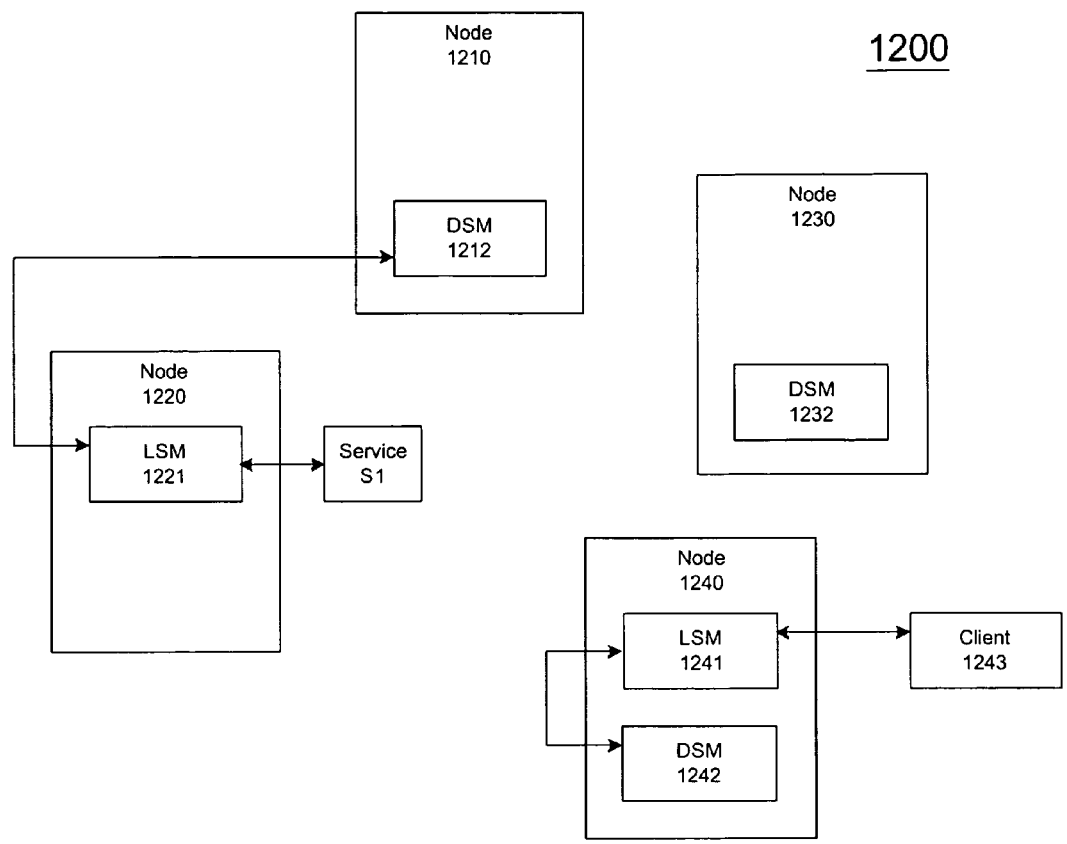
FIG. 12 is a block diagram depicting a process for propagating information about services amongst DSMs.

With reference now to FIG. 12, a block diagram depicts a process for propagating information about services amongst DSMs. System 1200 contains nodes 1210, 1220, 1230, and 1240. Node 1210 contains DSM 1212, and node 1220 contains LSM 1221. Node 1230 contains DSM 1232, and node 1240 contains LSM 1241 and DSM 1242. LSM 1221 manages service S1, and LSM 1241 supports client 1243. LSM 1241 is connected to DSM 1242, and LSM 1221 is connected to DSM 1212.

Service S1 is started through LSM 1221 and advertised by DSM 1212. When client 1243 wants access to service S1, LSM 1241 forwards the request to DSM 1242 because LSM 1241 does not have any knowledge of service S1. As DSM 1242 does not have any references for service S1, DSM 1242 tries to contact a DSM within the environment that may know about service S1. DSM 1242 publishes or broadcasts a REQUEST_FOR_ONE_SERVICE message, putting its ORB identifier into the source field of the message and a null in the destination field. The null means that all DSMs must check whether they can fulfill the request in the message, and all DSMs receive the message. DSM 1232 receives the message but discards it because it does not know about service S1. DSM 1242 also receives the message and discards it because the Oid is its own Oid. However, DSM 1212 will receive and process the message because it knows about service S1.

DSM 1212 publishes a REPLY_TO_ONE_SERVICE message with the service information for service S1. The source Oid is swapped to the destination field, and DSM 1212 puts its Oid in the source field of the message. The message is then published or broadcast, which is then received by every DSM in the environment. DSM 1212 and DSM 1232 discard the message because the Oid in the destination field does not match its Oid. DSM 1242 processes the message because the destination Oid matched its internal Oid. It stores the S1 service information locally and returns the proxy to LSM 1241, which then returns it to client 1243.

Services can also be removed from the environment. If an LSM gets a proxy from a DSM, it may test it and discover that the proxy is invalid. In this case, the LSM calls a deprecate-ServiceRef( ) method on the DSM to which it is connected. The DSM then publishes or broadcasts a DEPRECATE_SVC_INFO message to the other DSMs. By setting the destination field to null, every DSM will check the message, and every DSM subsequently checks its internal repository to see if any service information matches the request. If so, then the DSM invalidates its internal entry.

The advantages of the present invention should be apparent in view of the detailed description of the invention that is provided above. The processing required for fulfilling a request for a service is distributed through Local Service Managers (LSMs) and Distributed Service Managers (DSMs). The present invention automatically load balances according the scope of the requests issued by the clients connected to the distributed environment. A networked service's visibility is propagated based on matching criteria and not according to the load of the machine supporting the services.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method of balancing demand for networked services in a distributed data processing system, the method comprising the steps of:

initializing one or more local service managers within the distributed data processing system, wherein each local service manager has information about and provides access to networked services defined within a respective local region of the distributed data processing system for clients within the distributed data processing system, and wherein each client is uniquely associated with a local service manager;

initializing one or more distributed service managers within the distributed data processing system, wherein each distributed service manager provides access to the networked services to the local service managers within the distributed data processing system, and wherein each local service manager is uniquely associated with a distributed service manager;

receiving, at a distributed service manager, a request for a networked service from a local service manager for which the local service manager lacks information;

determining whether the distributed service manager has information about a networked service with one or more characteristics that match one or more parameters in the request for a networked service, wherein the determining step is accomplished by reference to a cache maintained by the distributed service manager which contains information resulting from prior requests for networked services; and returning information for referencing a matched networked service.

2. The method of claim 1 further comprising:

sending a request for a networked service from a requesting client to a local service manager associated with the requesting client; and returning information for referencing a matching networked service from the local service manager to the requesting client, wherein the matching networked service has characteristics that match parameters in the request for a networked service.

3. The method of claim 1 further comprising:

receiving a request for a networked service at a local service manager; and determining whether the local service manager has information for referencing a networked service with characteristics that match parameters in the request for a networked service.

4. The method of claim 3 further comprising:

responsive to a determination that the local service manager has information about a matching networked service, returning the information for referencing the matching networked service to the requesting client;

responsive to a determination that the local service manager does not have information about a matching networked service, forwarding the request for a networked service from the local service manager to a distributed service manager associated with the local service manager.

5. The method of claim 1 further comprising:

responsive to a determination that the distributed service manager does not have information about one or more matching networked services, broadcasting the request for a networked service from the distributed service manager to all distributed service managers in the distributed data processing system;

receiving information for referencing one or more matching networked services at the distributed service manager in response to the broadcast request; and caching the received information for referencing one or more matching networked services at the distributed service manager.

6. The method of claim 5 wherein each of the distributed service managers caches information resulting from requests of supported clients, and wherein the information which respective distributed service manager differs according to the requests of supported clients.

7. The method of claim 5 wherein each of the distributed service managers includes a localization module, wherein the parameters within respective localization modules are tailored to provide different load balancing for corresponding distributed service managers.

8. The method of claim 1 further comprising:

in response to a determination that the distributed service manager has information about two or more matching networked services, selecting a single networked service at the distributed service manager.

9. The method of claim 8 further comprising:

performing a load balancing operation at the distributed service manager to select the single networked service.

10. The method of claim 9 further comprising:

comparing network-related metrics during the load balancing operation.

11. The method of claim 10 further comprising:

comparing one or more of network-related metrics associated with an entire network path between a requesting client and a providing server.

12. The method of claim 11 wherein the network-related metrics are realtime network-related metrics and are selected from a group comprising:

bottleneck-link speed, round-trip time, and hop count.

13. The method of claim 1 further comprising:

determining whether the distributed service manager has information about a plurality of networked services with characteristics that match parameters in the request for a networked service and forming a set of matched network services;

determining, based on the request, whether to return a single matched network service of the set of matched network services or the set of matched network services;

responsive to a determination to return a single matched network service, returning information for referencing the single matched networked service from the distributed service manager to the local service manager; and responsive to a determination to return the set of matched network services, returning information for referencing the set of matched network services from the distributed service manager to the local service manager.

14. The method of claim 1 wherein a plurality of types of networked services are available in the distributed data processing system, and wherein one of the characteristics of a matching service is a type of service.

15. A method of balancing demand for networked services in a distributed data processing system, the method comprising the steps of:

initializing one or more local service managers within the distributed data processing system, wherein each local service manager has information about and provides access to networked services defined within a respective local region of the distributed data processing system for clients within the distributed data processing system, and wherein each client is uniquely associated with a local service manager;

initializing one or more distributed service managers within the distributed data processing system, wherein each distributed service manager provides access to the networked services to the local service managers within the distributed data processing system, and wherein each local service manager is uniquely associated with a distributed service manager;

receiving, at a distributed service manager, a request for a networked service from a local service manager for which the local service manager lacks information;

determining whether the distributed service manager has information about a networked service with one or more characteristics that match one or more parameters in the request for a networked service, wherein the determining step is accomplished by reference to a cache maintained by the distributed service manager which contains information resulting from prior requests for networked services;

returning information for referencing a matched networked service;

configuring the local service manager to not provide access to object request broker (ORB) services that provide internal service and which are valid only in a scope of a local ORB;

configuring the local service manager to provide access to ORB services that are instantiated on each ORB only through requests based on an ORB identifier; and configuring the local service manager to provide access to ORB services that may be accessed from outside the scope of the local ORB through requests based on both a service specification string and an ORB identifier.

\* \* \* \* \*